United States Patent
Xiang

(10) Patent No.: US 7,509,126 B2
(45) Date of Patent: Mar. 24, 2009

(54) METHOD AND SYSTEM FOR MOBILE STATION HANDOVERS WITH DIFFERENT PRIORITIES IN WIRELESS NETWORKS

(75) Inventor: Zhixian Xiang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 491 days.

(21) Appl. No.: 11/384,039

(22) Filed: Mar. 17, 2006

(65) Prior Publication Data
US 2007/0015509 A1  Jan. 18, 2007

Related U.S. Application Data

(60) Provisional application No. 60/698,669, filed on Jul. 12, 2005.

(51) Int. Cl.
*H04Q 7/22* (2006.01)
(52) U.S. Cl. .................................................. 455/436
(58) Field of Classification Search .................. None
See application file for complete search history.

(56) References Cited

U.S. PATENT DOCUMENTS

2005/0169301 A1* 8/2005 Jain et al. ................... 370/464
2007/0117564 A1* 5/2007 Reynolds .................... 455/436
2008/0032695 A1* 2/2008 Zhu et al. .................... 455/442

OTHER PUBLICATIONS

Xiang, D., et al. "Network Initiated Mandatory HO," IEEE 802.16 Broadband Wireless Access Working Group, Jul. 18, 2005, pp. 0-3.
"Creating Wired-cum-Wireless and MobileIP Simulations in ns," Tutorial for the UCB/LBNL/VINT Network Simulator "ns", downloaded Feb. 20, 2006, http://www.isi.edu/nsnam/ns/tutorial/ns-script6.html, pp. 1-10, Information Sciences Institute.

* cited by examiner

*Primary Examiner*—Ajit Patel
(74) *Attorney, Agent, or Firm*—Slater & Matsil, L.L.P.

(57) ABSTRACT

A method and system for processing a handover request in a wireless network. The method includes receiving a first message from a first base station by a mobile station. The first message includes a handover request, the handover request includes a priority indicator, and the priority indicator indicates a priority level selected from a plurality of priority levels. Additionally, the system includes determining the priority level based on at least information associated with the first message by the mobile station, processing information associated with the priority level by the mobile station, and determining at least one criterion based on at least information associated with the priority level by the mobile station. Moreover, the system includes processing information associated with the handover request and the at least one criterion by the mobile station.

25 Claims, 12 Drawing Sheets

| Syntax | Size (bits) | Notes |
|---|---|---|
| MOB_BSHO-REQ_Message_Format() { | — | — |
| Management Message Type = 56 | 8 | — |
| Network Assisted HO supported | 1 | Indicates that the BS supports Network Assisted HO |
| Mode | 3 | 0b000: HO request<br>0b001: SHO/FBSS request: Anchor BS update with CID update<br>0b010: SHO/FBSS request: Anchor BS update without CID update<br>0b011: SHO/FBSS request: Active Set update with CID update<br>0b100: SHO/FBSS request: Active Set update without CID update<br>0b101: SHO/FBSS request: Active Set update with CID update for newly added BS<br>0b110: SHO/FBSS request: Active Set update with CID update and CQICH allocation for newly added BS<br>0b111: reserved |
| *Padding* | 4 | Shall be set to zero. |
| If (Mode == 0b000) { | — | — |
| N_Recommended | 8 | — |
| Resource Retain Type | 1 | 0: MS resource release<br>1: MS resource retain |
| *Padding* | 7 | Shall be set to zero. |
| for (j=0 ; j<N_Recommended ; j++) { | — | N_Recommended can be derived from the known length of the message |
| Neighbor BSID | 48 | — |
| Service level prediction | 8 | — |
| Preamble index/Subchannel Index | 8 | |
| HO process optimization | 8 | |
| Network Assisted HO supported | 1 | Indicates that the BS supports Network Assisted HO. |
| HO_ID_included_indicator | 1 bit | To indicate if the field HO_IND is included |
| If (HO_ID_included_indicator == 1) { | — | — |
| HO_ID | 8 | ID assigned for use in initial ranging to the target BS once this BS is selected as the target BS (see 6.3.20.5) |
| } | — | — |
| HO_authorization policy indicator | 1 | To indicate if authorization negotiation is used in HO procedure.<br>0: EAP authorization and the value of the MAC mode field in the current BS (default)<br>1: The authorization policy for the target BS is negotiated. |
| If (HO_authorization policy indicator == 1) { | — | — |

Figure 6

| Syntax | Size (bits) | Notes |
|---|---|---|
| MOB_BSHO-RSP_Message_Format() { | — | — |
| Management Message Type = 58 | 8 | — |
| Mode | 3 | 0b000: HO request<br>0b001: SHO/FBSS request: Anchor BS update with CID update<br>0b010: SHO/FBSS request: Anchor BS update without CID update<br>0b011: SHO/FBSS request: Active Set update with CID update<br>0b100: SHO/FBSS request: Active Set update without CID update<br>0b101: SHO/FBSS request: Active Set update with CID update for newly added BS<br>0b110: : SHO/FBSS request: Active Set update with CID update and CQICH allocation for newly added BS<br>0b111: reserved |
| Reserved | 5 | Shall be set to zero. |
| If (Mode == 0b000) { | — | — |
| N_Recommended | 8 | — |
| For (j=0 ; j<N_Recommended ; j++) { | — | Neighbor base stations shall be presented in an order such that the first presented is the one most recommended and the last presented is the least recommended. |
| Neighbor BSID | 48 | — |

| Syntax | Size (bits) | Notes |
|---|---|---|
| MOB_BSHO-REQ_Message_format() { | — | — |
| Management Message Type = 56 | 8 | — |
| Network Assisted HO supported | 1 | Indicates that the serving BS supports Network Assisted HO |
| Mode | 3 | 0b000: HO request<br>0b001: MDHO/FBSS request: Anchor BS update with CID update<br>0b010: MDHO/FBSS request: Anchor BS update without CID update<br>0b011: MDHO/FBSS request: Diversity Set update with CID update<br>0b100: MDHO/FBSS request: Diversity Set update without CID update<br>0b101: MDHO/FBSS request: Diversity Set update with CID update for newly added BS<br>0b110: MDHO/FBSS request: Diversity Set update with CID update and CQICH allocation for newly added BS<br>0b111: reserved |
| Padding | 4 | Shall be set to zero. |
| If (Mode == 0b000) { | — | — |
| HO operation mode | 1 | 0: Recommended HO request.<br>1: Mandatory HO request. |
| N_Recommended | 8 | — |
| Resource Retain Flag | 1 | 0: MS resource release<br>1: MS resource retain |
| Padding | 6 | Shall be set to zero. |
| for (j=0 ; j<N_Recommended ; j++) { | — | N_Recommended can be derived from the known length of the message |

| Syntax | Size (bits) | Notes |
|---|---|---|
| MOB_BSHO-RSP_Message_format() { | — | — |
| Management Message Type = 58 | 8 | — |
| Mode | 3 | 0b000: HO request<br>0b001: MDHO/FBSS request: Anchor BS update with CID update<br>0b010: MDHO/FBSS request: Anchor BS update without CID update<br>0b011: MDHO/FBSS request: Diversity Set update with CID update<br>0b100: MDHO/FBSS request: Diversity Set update without CID update<br>0b101: MDHO/FBSS request: Diversity Set update with CID update for newly added BS<br>0b110: MDHO/FBSS request: Diversity Set update with CID update and CQICH allocation for newly added BS<br>0b111: MS handover request not recommended (BS in list unavailable) |

Figure 11(A)

| Reserved | 5 | Shall be set to zero. |
|---|---|---|
| If (Mode == 0b000) { | — | — |
| HO operation mode | 1 | 0: Recommended HO response.<br>1: Mandatory HO response. |
| N_Recommended | 8 | — |
| Resource Retain Flag | 1 | 0: Release connection information<br>1: Retain connection information |
| Reserved | 7 | Shall be set to zero. |
| For (j=0 ; j<N_Recommended ; j++) { | — | Neighbor base stations shall be presented in an order such that the first presented is the one most recommended and the last presented is the least recommended. |
| Neighbor BSID | 48 | — |
| Preamble index/ Preamble Present & Subchannel Index | 8 | For the SCa and OFDMA PHY this parameter defines the PHY specific preamble for the neighbor BS. For the OFDM PHY the 5 LSB contain the active DL subchannel index for the neighbor BS. The 3 MSB shall be Reserved and set to '0b000'. |
| Service level prediction | 8 | — |
| HO process optimization | 8 | — |
| Network Assisted HO supported | 1 | Indicates that the BS supports Network Assisted HO. |
| HO_ID_included_indicator | 1 | Indicates if the field HO_IND is included |
| If (HO_ID_included_indicator == 1) { | — | — |
| HO_ID | 8 | ID assigned for use in initial ranging to the target BS once this BS is selected as the target BS |
| } | — | — |
| HO_authorization policy indicator | 1 | To indicate if authorization negotiation is used in HO procedure.<br>0: EAP authorization and the value of the MAC mode field in the current BS (default)<br>1: The authorization policy for the target BS is negotiated. |
| Reserved | 4 | Shall be set to zero. |
| If (HO_authorization policy indicator == 1) { | — | — |
| HO_authorization_policy_support | 8 | Bit #0: RSA authorization<br>Bit #1: EAP authorization<br>Bit #2: Authenticated-EAP authorization<br>Bit #3: HMAC supported<br>Bit #4: CMAC supported<br>Bit #5: 64-bit Short-HMAC<br>Bit #6: 80-bit Short-HMAC<br>Bit #7: 96-bit Short-HMAC |

Figure 11(B)

METHOD AND SYSTEM FOR MOBILE STATION HANDOVERS WITH DIFFERENT PRIORITIES IN WIRELESS NETWORKS

CROSS-REFERENCES TO RELATED APPLICATIONS

This application claims priority to U.S. Provisional Application No. 60/698,669, filed Jul. 12, 2005, which is incorporated by reference herein.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a method and system for mobile station handovers with various priorities in wireless networks. Merely by way of example, the invention is described as it applies to base-station initiated handovers, but it should be recognized that the invention has a broader range of applicability.

Techniques for wireless communications have progressed through the years. A wireless network usually includes base stations and mobile stations. For example, a mobile station (MS) refers to a station that is to be used while in motion or during halts at unspecified geographic locations. As an example, the mobile station is a mobile communication device. In another example, the mobile station is a cellular phone. In yet another example, a base station (BS) refers to a set of equipment that can provide connectivity, management, and control for one or more mobile stations. Often, a mobile station communicates with other devices through an air-interface provided by a base station. For example, the air-interface refers to an interface between the base station and the mobile station. Usually, the air-interface can be changes through a process called mobile station handover (HO). During handover, the mobile station, for example, can migrate from an air-interface provided by one base station to another air-interface provided by another base station. The handover can be initiated by either the mobile station or the base station for various reasons such as mobile-station movement, change in connection quality, and/or change in network configuration.

FIG. 1 shows a simplified conventional wireless network. The network 100 includes base stations 110, 112, and 114, and a mobile station 120. The base stations 110, 112, and 114 each are connected to a wired network 130. For example, the wired network 130 uses internet protocol (IP). The mobile station 120 communicates through an air-interface with the base station 110.

FIGS. 2 and 3 are simplified conventional diagrams for mobile-station handover in wireless network. In the network 100, the base station 110 sends a request message to the mobile station 120 to initiate a handover. The request includes a list of base stations to which the mobile station 120 can be handed over. If the mobile station 120 determines the requested handover to be suitable, the mobile station 120 selects one base station from the list and sends an acknowledgment message back to the base station 110. For example, in the acknowledge message, the mobile station 120 also informs the base station 110 that the base station 112 has been selected. Subsequently, the mobile station 120 is handed over to the base station 112.

FIGS. 4 and 5 are other simplified conventional diagrams for mobile-station handover in wireless network. In the network 100, the base station 110 sends a request message to the mobile station 120 to initiate a handover. The request includes a list of base stations to which the mobile station 120 can be handed over. As shown in FIGS. 4 and 5, if the mobile station 120 determines the requested handover is not suitable, the mobile station 120 sends a rejection message to the base station 110. In response, the base station 110 can send a response message that is used as another request and includes another list of base stations to which the mobile station 120 can be handed over. Additionally, the mobile station 110 can again reject the handover request in the response message, and in turn the base station 110 can continue the negotiation with the mobile station 120 by sending another response message as shown in FIG. 5.

FIGS. 6 and 7 show simplified conventional partial formats for request message and response message for handover respectively. As shown in FIGS. 6 and 7, the request message is called MOB_BSHO-REQ, and the response message is called MOB_BSHO-RSP. For example, the MOB_BSHO-REQ message is sent from the base station 110 to the mobile station 120 for initiating a handover. As another example, the MOB_BSHO-RSP message is sent from the base station 110 to the mobile station 120 in response to a rejection from the mobile station 120. The handover rejection by the mobile station and/or the handover negotiation between the mobile station and the base station may degrade network performance.

Hence it is highly desirable to improve techniques for mobile station handovers.

BRIEF SUMMARY OF THE INVENTION

The present invention relates in general to telecommunication techniques. More particularly, the invention provides a method and system for mobile station handovers with various priorities in wireless networks. Merely by way of example, the invention is described as it applies to base-station initiated handovers, but it should be recognized that the invention has a broader range of applicability.

According to one embodiment of the present invention, a method for processing a handover request in a wireless network includes receiving a first message from a first base station by a mobile station. The first message includes a handover request, the handover request includes a priority indicator, and the priority indicator indicates a priority level selected from a plurality of priority levels. Additionally, the system includes determining the priority level based on at least information associated with the first message by the mobile station, processing information associated with the priority level by the mobile station, and determining at least one criterion based on at least information associated with the priority level by the mobile station. Moreover, the system includes processing information associated with the handover request and the at least one criterion by the mobile station, and determining whether to accept the handover request based on at least information associated with the handover request and the at least one criterion by the mobile station. The handover request includes information associated with at least a second base station to which the mobile station is requested to be handed over from the first base station.

According to another embodiment of the present invention, a mobile station for a wireless network includes one or more components for processing a handover request. The one or more components are configured to receive a first message from a first base station. The first message includes a handover request, the handover request includes a priority indicator, and the priority indicator indicates a priority level selected from a plurality of priority levels. Additionally, the one or more components are configured to determine the priority level based on at least information associated with the first message, process information associated with the priority level, and determine at least one criterion based on at least information associated with the priority level. Moreover, the one or more components are configured to process information associated with the handover request and the at least one criterion, and determine whether to accept the handover request based on at least information associated with the handover request and the at least one criterion. The handover request includes information associated with at least a second base station to which the mobile station is requested to be handed over from the first base station.

According to yet another embodiment of the present invention, a method for processing a handover request in a wireless network includes generating a first message by a first base station. The first message includes a first handover request, the first handover request includes a first priority indicator, and the first priority indicator indicates a first priority level selected from a plurality of priority levels. Additionally, the method includes sending the first message from the first base station to a mobile station, and receiving a second message from the mobile station. The second message indicates whether the mobile station has determined to accept the first handover request. Moreover, the method includes processing information associated with the second message by the first base station, and determining whether to send a third message to the mobile station based on at least information associated with the first priority level and the second message. The first handover request includes information associated with at least a second base station to which the mobile station is requested to be handed over from the first base station. The third message includes a second handover request, the second handover request includes a second priority indicator, the second priority indicator indicates a second priority level selected from the plurality of priority levels.

According to yet another embodiment of the present invention, a base station for a wireless network includes one or more components for processing a handover request. The one or more components are configured to generate a first message. The first message includes a first handover request, the first handover request includes a first priority indicator, and the first priority indicator indicates a first priority level selected from a plurality of priority levels. Additionally, the one or more components are configured to send the first message to a mobile station, and receive a second message from the mobile station. The second message indicates whether the mobile station has determined to accept the first handover request. Moreover, the one or more components are configured to process information associated with the second message, and determine whether to send a second message to the mobile station based on at least information associated with the first priority level and the second message. The first handover request includes information associated with at least another base station to which the mobile station is requested to be handed over. The second message includes a second handover request, the second handover request includes a second priority indicator, and the second priority indicator indicates a second priority level selected from the plurality of priority levels.

According to yet another embodiment of the present invention, a method for processing a handover response in a wireless network includes receiving a first message from a first base station by a mobile station. The first message includes a handover response, the handover response includes a priority indicator, and the priority indicator indicates a priority level selected from a plurality of priority levels. Additionally, the method includes determining the priority level based on at least information associated with the first message by the mobile station, processing information associated with the priority level by the mobile station, and determining at least one criterion based on at least information associated with the priority level by the mobile station. Moreover, the method includes processing information associated with the handover response and the at least one criterion by the mobile station, and determining whether to accept the handover response based on at least information associated with the handover response and the at least one criterion by the mobile station. The handover response includes information associated with at least a second base station to which the mobile station is asked to be handed over from the first base station.

According to yet another embodiment of the present invention, a mobile station for a wireless network includes one or more components for processing a handover response. The one or more components are configured to send a first message to a first base station. The first message includes a handover request. Additionally, the one or more components are configured to receive a second message from the first base station in response to the first message. The second message includes a handover response, the handover response includes a priority indicator, and the priority indicator indicates a priority level selected from a plurality of priority levels. Moreover, the one or more components are configured to determine the priority level based on at least information associated with the second message, process information associated with the priority level, and determine at least one criterion based on at least information associated with the priority level. Also, the one or more components are configured to process information associated with the handover response and the at least one criterion, and determine whether to accept the handover response based on at least information associated with the handover response and the at least one criterion. The handover response includes information associated with at least a second base station to which the mobile station is asked to be handed over from the first base station.

According to yet another embodiment of the present invention, a method for processing a handover response in a wireless network includes generating a first message by a first base station. The first message includes a first handover response, the first handover response includes a first priority indicator, and the first priority indicator indicates a first priority level selected from a plurality of priority levels. Additionally, the method includes sending the first message from the first base station to a mobile station, and receiving a second message from the mobile station. The second message indicates whether the mobile station has determined to accept the first handover response. Moreover, the method includes processing information associated with the second message by the first base station, and determining whether to send a third message to the mobile station based on at least information associated with the first priority level and the second message. The first handover response includes information associated with at least a second base station to which the mobile station is asked to be handed over from the first base station. The third message includes a second handover request, the second handover request includes a second priority indicator, and the second priority indicator indicates a second priority level selected from the plurality of priority levels.

According to yet another embodiment of the present invention, a base station for a wireless network includes one or more components for processing a handover response. The one or more components are configured to generate a first message by a first base station. The first message includes a first handover response, the first handover response includes a first priority indicator, and the first priority indicator indicates a first priority level selected from a plurality of priority levels. Additionally, the one or more components are configured to send the first message from the first base station to a mobile station, and receive a second message from the mobile station. The second message indicates whether the mobile station has determined to accept the first handover response. Moreover, the one or more components are configured to process information associated with the second message by the first base station, and determine whether to send a third message to the mobile station based on at least information associated with the first priority level and the second message. The first handover response includes information associated with at least a second base station to which the mobile station is asked to be handed over from the first base station. The third message includes a second handover request, the second handover request includes a second priority indicator, and the second priority indicator indicates a second priority level selected from the plurality of priority levels.

Many benefits are achieved by way of the present invention over conventional techniques. Certain embodiments of the present invention can improve efficiency and smoothness of mandatory handover initiated by a base station. Some embodiments of the present invention provide mandatory network-initiated handover mechanism. Certain embodiments of the present invention provide different priority levels for handover requested by a base station in a handover request and/or a handover response. For example, a mobile station receives a handover request and/or a handover response, and the handover request and/or the handover response include a handover instruction. The mobile station then processes the handover instruction according to a set of criteria corresponding to the priority level. Some embodiments of the present invention can distinguish different types of handover requests initiated by a base station and process these different types of handover requests based on various criteria. Certain embodiments of the present invention can distinguish different types of handovers in handover responses that are made in response to handover requests initiated by a mobile station, and process these different types of handovers based on various criteria.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF THE DRAWINGS

FIGS. 6 and 7 show simplified conventional partial formats for request message and response message for handover respectively;

FIG. 9 is a simplified diagram showing at least parts of a request message for mobile station handover in wireless network according to an embodiment of the present invention;

FIGS. 11(A) and (B) are simplified diagrams showing at least parts of a response message for mobile station handover in wireless network according to an embodiment of the present invention.

DETAILED DESCRIPTION OF THE INVENTION

The present invention relates in general to telecommunication techniques. More particularly, the invention provides a method and system for mobile station handovers with various priorities in wireless networks. Merely by way of example, the invention is described as it applies to base-station initiated handovers, but it should be recognized that the invention has a broader range of applicability.

Sometimes, a base station that provides an air-interface to a mobile station has to hand over the mobile station to another base station. For example, when a base station is to be taken offline for maintenance, all the mobile stations connected to this base station should to be handed over to another base station. In another example, when a base station cannot satisfy service needs of a mobile station, the mobile station should be handed over to another base station. These handovers often have to be performed quickly, with no time to negotiation with the mobile station.

In some conventional handover techniques, the base station does not indicate any priority or reason for initiating a handover in its request message or its response message to the mobile station. Consequently, the mobile station often cannot distinguish handover requests with different reasons and/or different priorities. Instead, the mobile station treats all the handover requests as if they had the same priority and/or the same reason. In response, the mobile station can reject and/or cancel a handover request, or to negotiate the handover configuration with the base station based on conditions at the mobile station. For example, the handover configuration includes a list of base stations to which the mobile station can be handed over. In another example, the rejection, cancellation, and/or negotiation may cause the mobile station to lose connection with the rest of network even though the mobile station is capable of being handed over. Specifically, the mobile station, not knowing the criticality and/or necessity of the requested handover, rejects the handover or keeps on exchanging messages with the base station to negotiate the handover configuration. Hence some handover requests are critical and more time sensitive than other handover requests.

Figure 1:
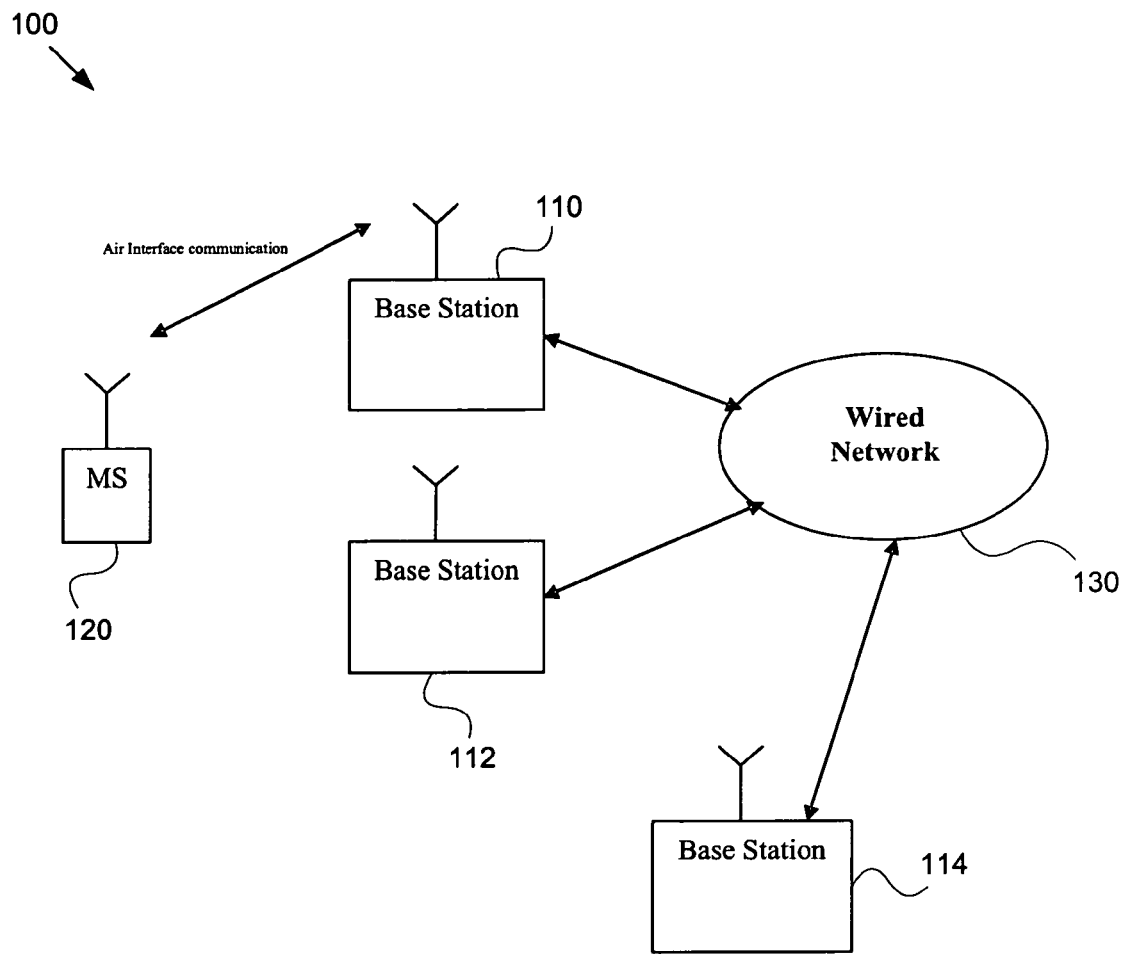
FIG. 1 shows a simplified conventional wireless network.
Figure 2:
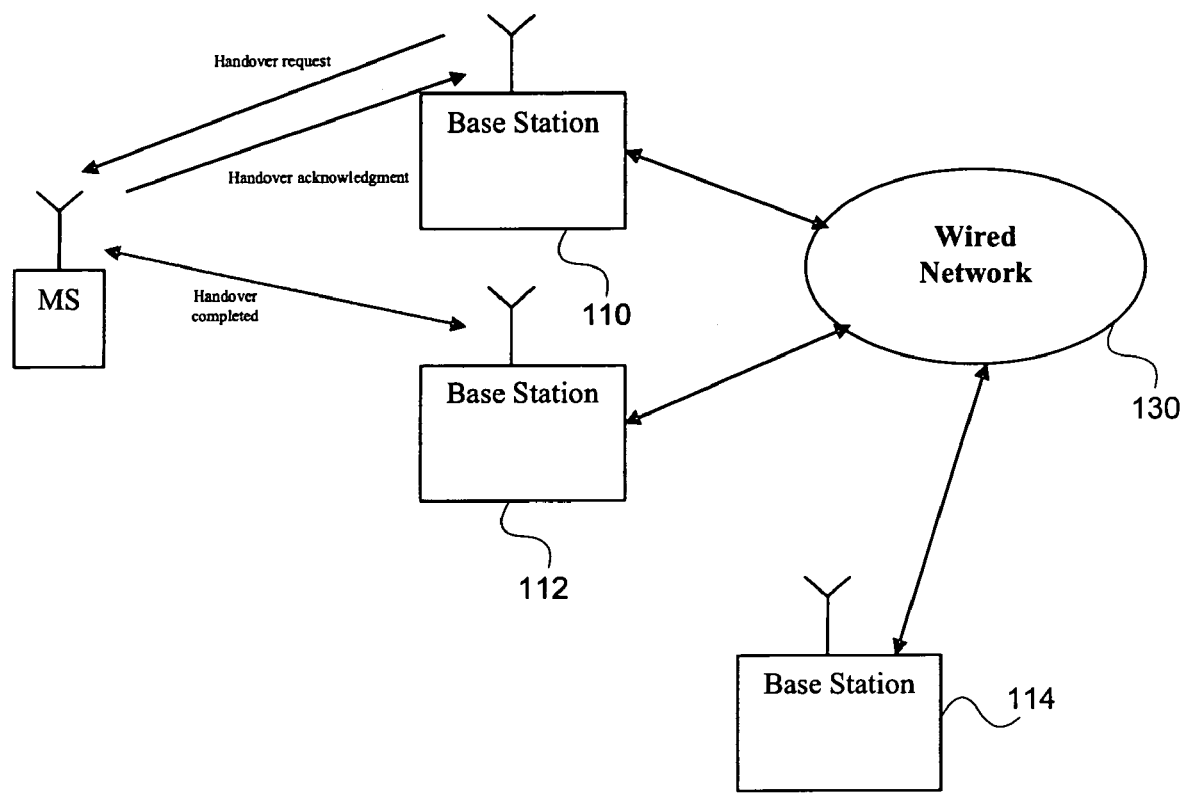
FIGS. 2 and 3 are simplified conventional diagrams for mobile-station handover in wireless network.
Figure 3:
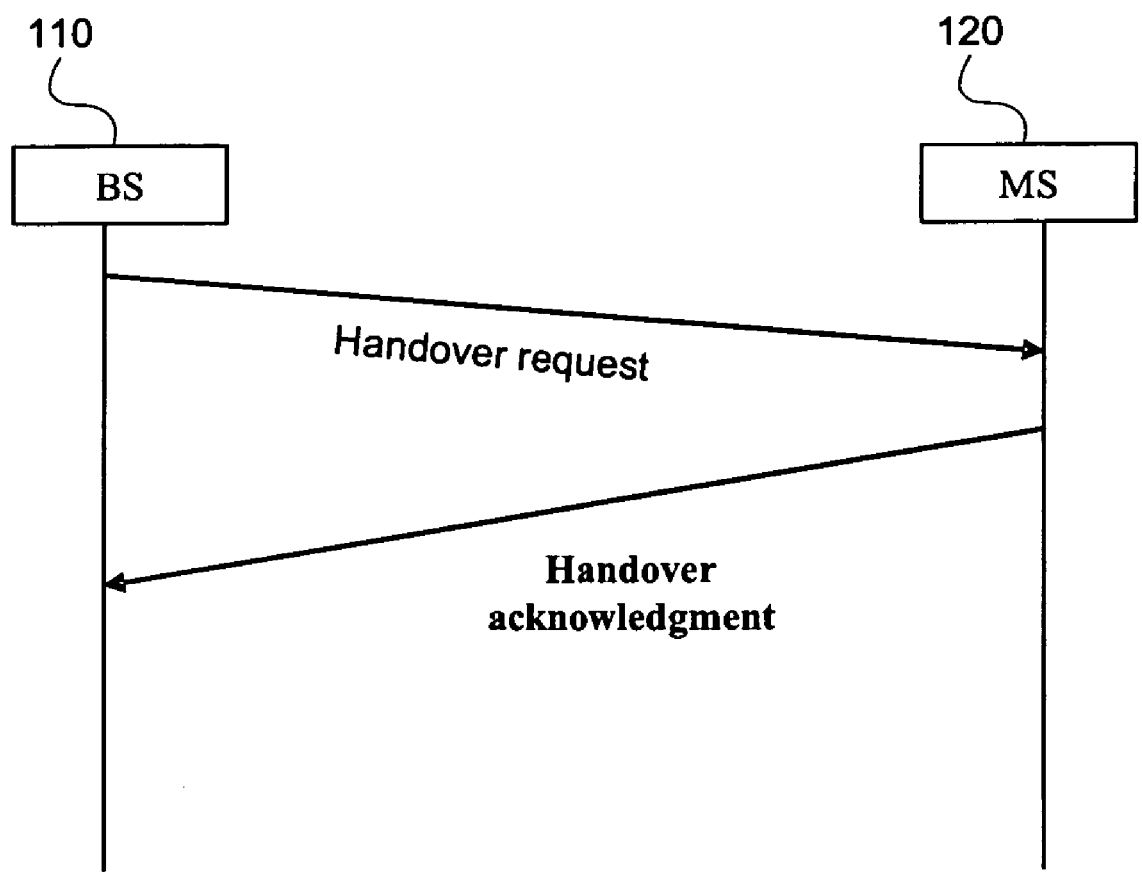
Figure 4:
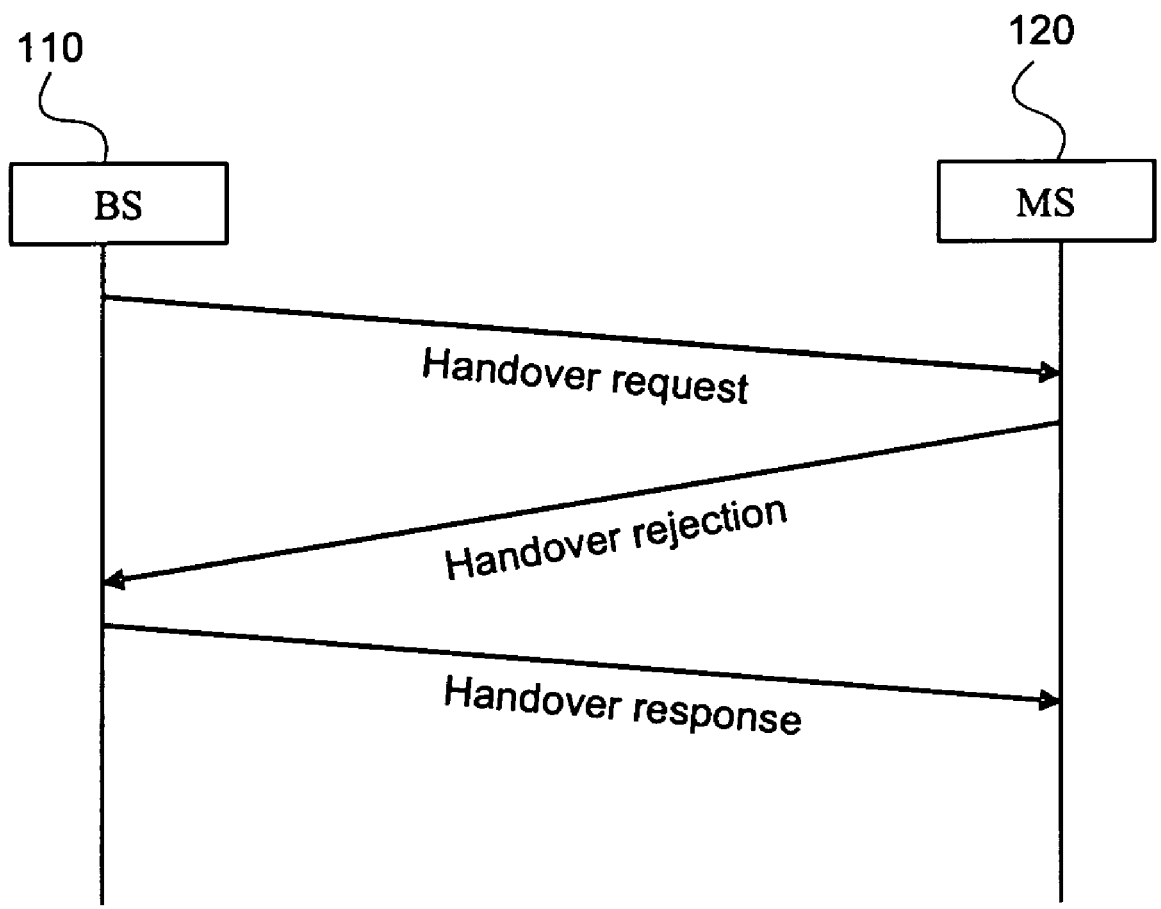
FIGS. 4 and 5 are other simplified conventional diagrams for mobile-station handover in wireless network.
Figure 5:
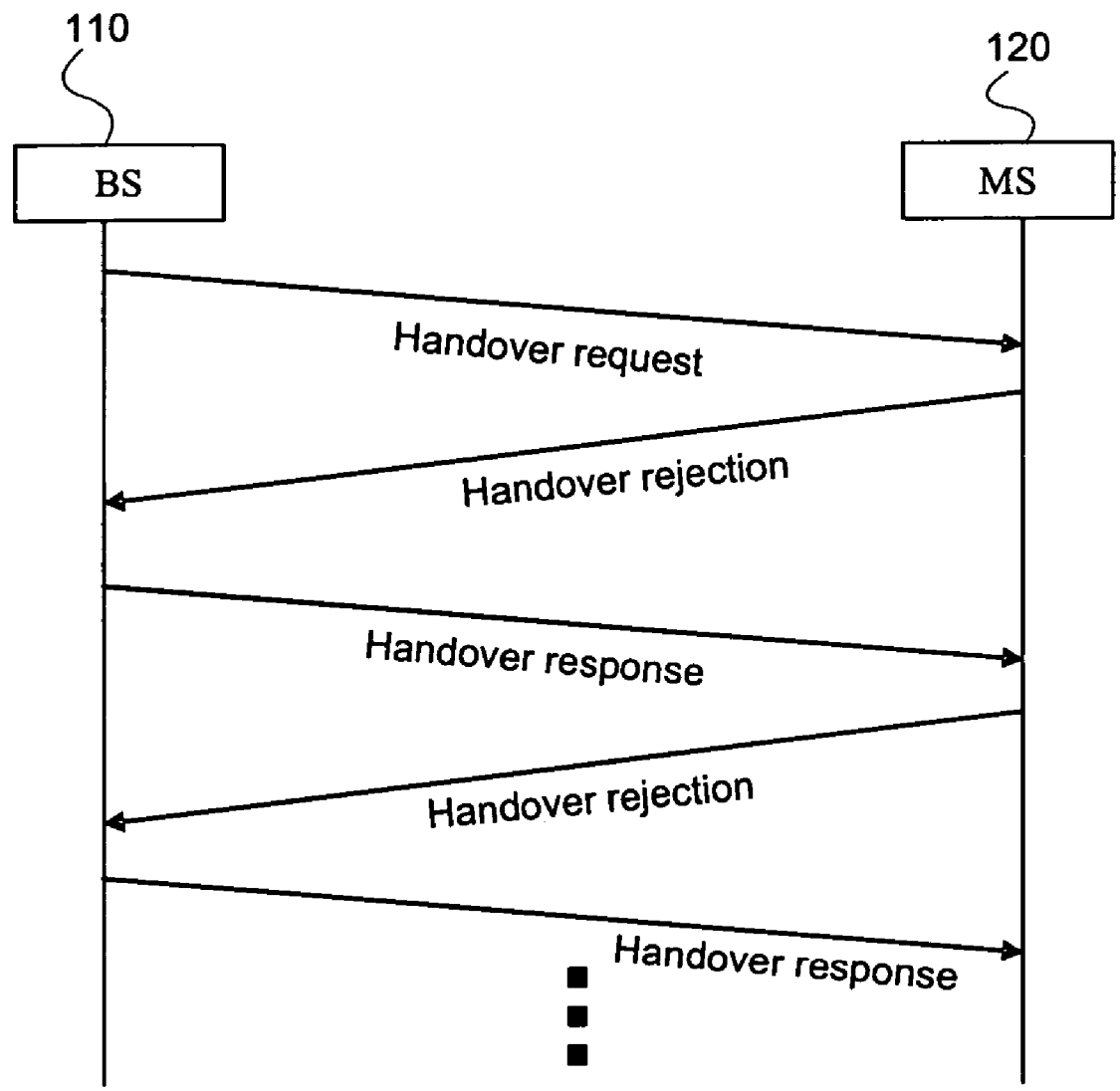
Figure 8:
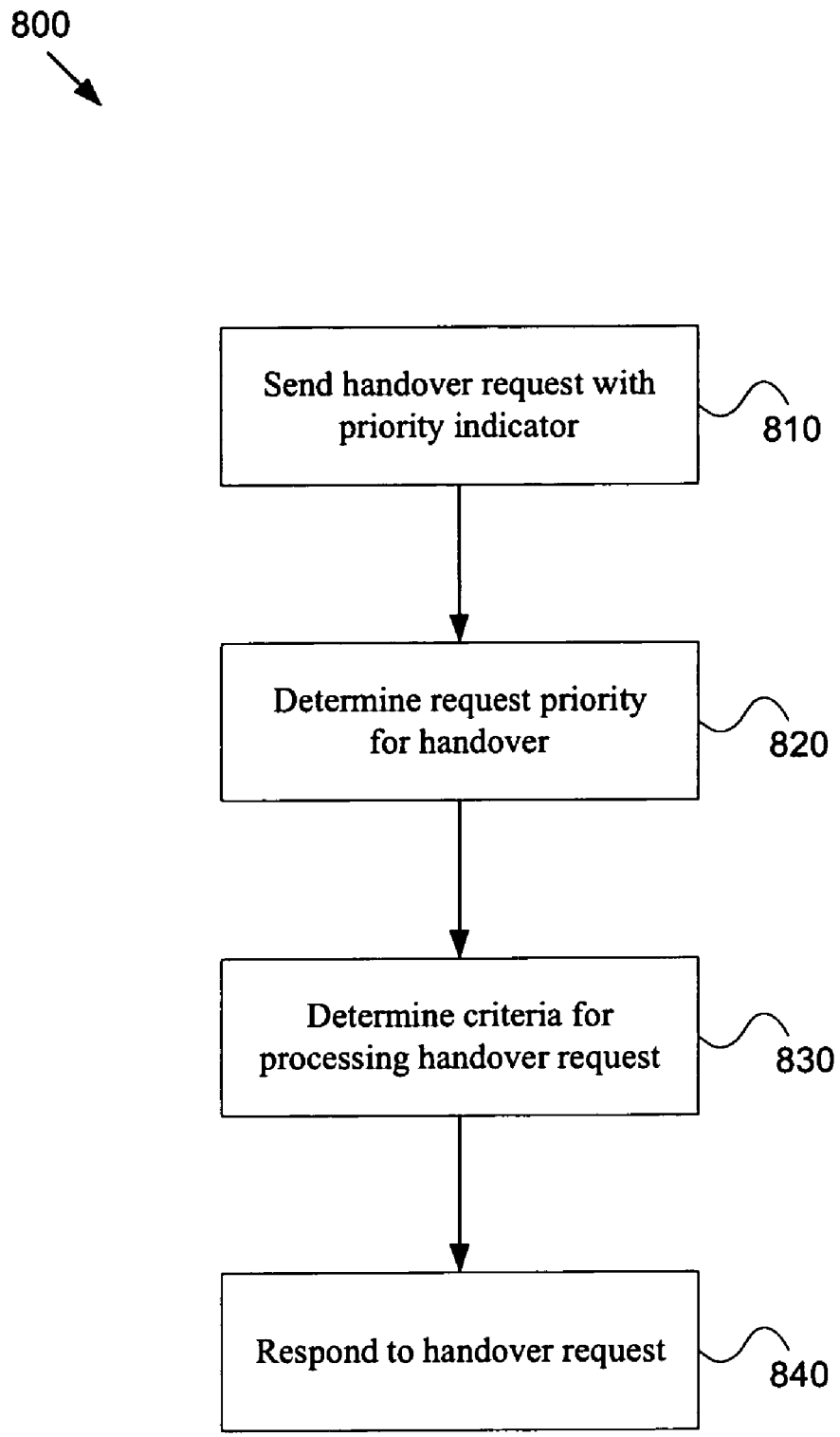
FIG. 8 is a simplified method for mobile station handover in wireless network according to an embodiment of the present invention.

FIG. 8 is a simplified method for mobile station handover in wireless network according to an embodiment of the present invention. This diagram is merely an example, which should not unduly limit the scope of the claims. One of ordinary skill in the art would recognize many variations, alternatives, and modifications. The method 800 includes process 810 for sending handover request with priority indicator, process 820 for determining request priority for handover, process 830 for determining criteria for processing handover request, and process 840 for responding to handover request. Although the above has been shown using a selected group of processes for the method 800, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method 800 are performed by a computer or a processor directed by a code. In another example, some or all processes of the method 800 are performed according to instructions included by a computer-readable medium in a computer program product. Further details of these processes are found throughout the present specification and more particularly below.

At the process 810, a request for handover is sent with priority indicator. For example, the request for handover is sent by a base station and received by a mobile station. The mobile station can communicate with the base station through an air-interface provided by the base station. In another example, the request for handover is made through a request message, which also includes priority indicator. In yet another example, the priority indicator provides information about priority level of the handover request. In one embodiment, the priority level indicates that the handover is mandatory. In another embodiment, the priority level indicates that the handover is recommended.

At the process 820, the priority level for handover request is determined. For example, a mobile station receives the handover request, processes the priority indicator, and determines the priority level. In one embodiment, the requested handover is mandatory. In another embodiment, the requested handover is recommended.

At the process 830, criteria for processing handover request is determined based on priority level. For example, if the requested handover is mandatory, the mobile station should accept the request unless the mobile station is unable to perform such handover. In one embodiment, the mobile station is unable to perform the handover if the mobile station cannot be handed over to any base station listed in the handover request. In another embodiment, the mobile station is unable to perform the handover if the mobile station cannot be handed over to any base station, regardless of whether the base station is or is not listed in the handover request.

In another example, if the requested handover is recommended, the mobile station can determine whether to accept the request based on conditions at the mobile station. In one embodiment, the mobile station determines to reject and/or negotiate the recommended handover even though the mobile station is capable of performing the requested handover. In another embodiment, the mobile station determines to accept the recommended handover.

At the process 840, a response to handover request is made. For example, the response is sent by a mobile station that receives the handover request to a base station that has made the request. In one embodiment, the mobile station accepts the requested handover by sending an acknowledgment message to the base station. For example, the mobile station is handed over to a base station selected from the list of base stations provided with the handover request. In another example, the mobile station is handed over to a base station not selected from the list of base stations provided with the handover request.

In another embodiment, the mobile station rejects the requested handover by sending a rejection message to the base station. For example; if the base station receives a rejection to the mandatory handover, the base station would not make another handover request within a predetermined period of time or under some predetermined conditions. In another example, if the base station receives a rejection to the mandatory handover, the base station would make another handover request after a predetermined period of time or under certain predetermined conditions. For example, the process 810 is performed again and followed by one or more other processes. In yet another embodiment, the mobile station negotiates with the base station about handover configuration. For example, the handover configuration includes a list of base stations to which the mobile station can be handed over.

According to certain embodiments of the present invention, the method 800 uses a request for handover with priority indicator. The request for handover is made through a request message, which also includes a field for priority indicator. As an example, FIG. 9 is a simplified diagram showing at least parts of a request message for mobile station handover in wireless network according to an embodiment of the present invention. This diagram is merely an example, which should not unduly limit the scope of the claims. One of ordinary skill in the art would recognize many variations, alternatives, and modifications.

As shown in FIG. 9, the request message 900 includes an indication variable called HO operation mode. For example, the HO operation mode is used as the priority indicator for process 810. In another example, the HO operation mode is a 1-bit parameter to indicate priority level of the requested handover. In yet another example, if the HO operation mode is equal to 0, the handover is recommended, and if the HO operation mode is equal to 1, the handover is mandatory. In yet another example, the request message 900 is called MOB_BSHO-REQ.

In one embodiment, the base station sends a request message to the mobile station with HO operation mode equal to 0. The requested handover is recommended, not mandatory. The mobile station processes and responds to the handover request based on conditions at the mobile station. For example, the mobile station can reject and/or negotiate the recommended handover with the base station even though the mobile station is capable of performing the requested handover.

In another embodiment, the base station sends a request message to the mobile station with HO operation mode equal to 1. The requested handover is mandatory. For example, the mobile station processes and accepts the handover request if the mobile station is capable of performing the mandatory handover. The acceptance is made by sending an acknowledgment message to the base station. In another example, if the mobile station is not capable of performing the mandatory handover to any base station listed in the request message, the mobile station rejects the handover request and negotiates with the base station about handover configuration. In one embodiment, if the base station receives a rejection to the mandatory handover, the base station would not make another mandatory handover request within a predetermined period of time or under predetermined conditions.

Figure 10:
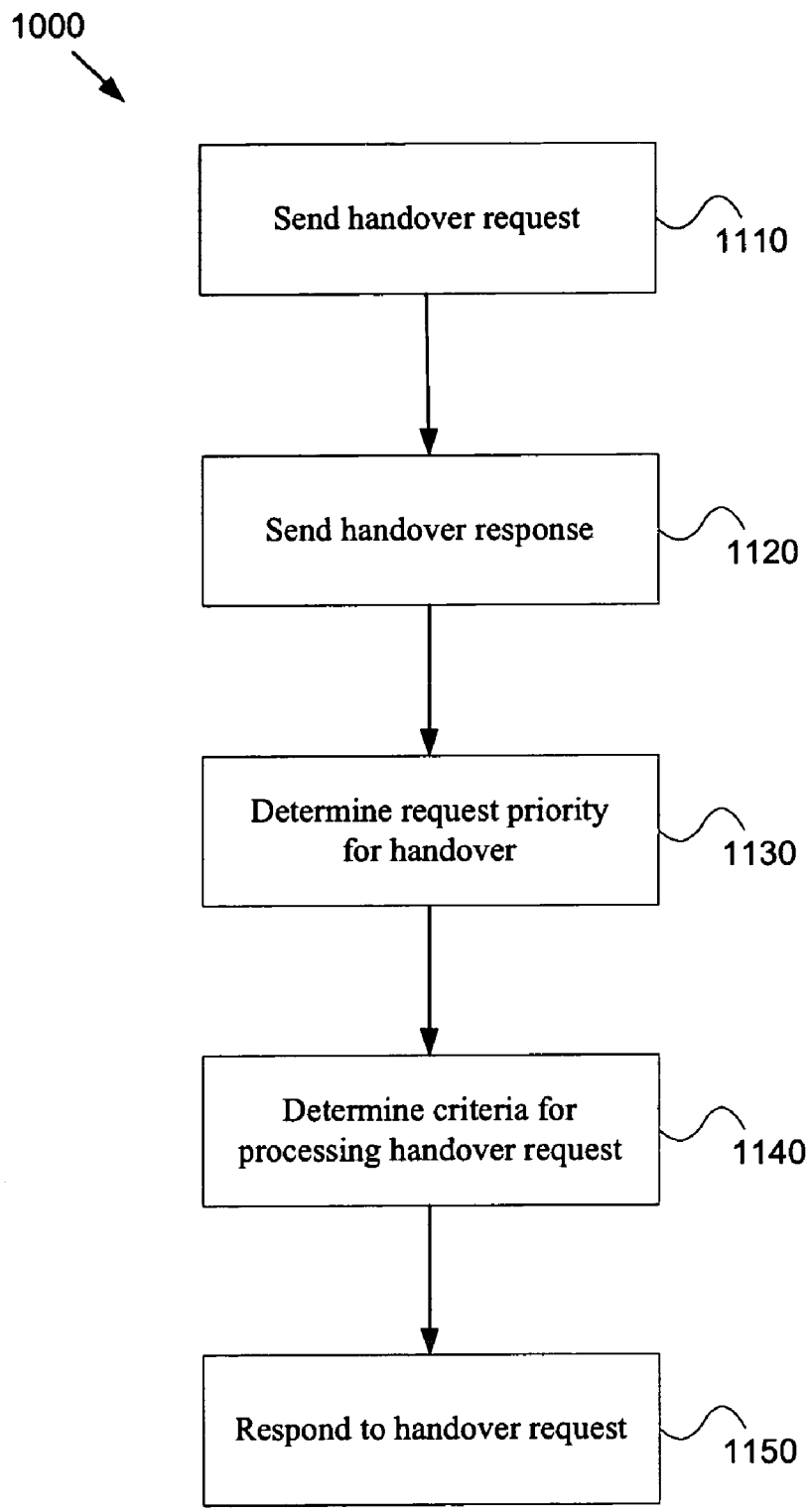
FIG. 10 is a simplified method for mobile station handover in wireless network according to another embodiment of the present invention.

FIG. 10 is a simplified method for mobile station handover in wireless network according to another embodiment of the present invention. This diagram is merely an example, which should not unduly limit the scope of the claims. One of ordinary skill in the art would recognize many variations, alternatives, and modifications. The method 1000 includes process 1010 for sending handover request, process 1020 for sending handover response, process 1030 for determining request priority for handover, process 1040 for determining criteria for processing handover request, and process 1050 for responding to handover response. Although the above has been shown using a selected group of processes for the method 1000, there can be many alternatives, modifications, and variations. For example, some of the processes may be expanded and/or combined. Other processes may be inserted to those noted above. Depending upon the embodiment, the sequence of processes may be interchanged with others replaced. As an example, some or all processes of the method 1000 are performed by a computer or a processor directed by a code. In another example, some or all processes of the method 1000 are performed according to instructions included by a computer-readable medium in a computer program product. Further details of these processes are found throughout the present specification and more particularly below.

At the process 1010, a request for handover is sent. For example, the request for handover is sent by a mobile station and received by a base station. In another example, the request for handover is made through a request message. At the process 1020, a response for handover is made in response to the request for handover. For example, the response for handover is sent by the base station and received by the mobile station. The mobile station can communicate with the base station through an air-interface provided by the base station. In another example, the response for handover is made through a response message, which also includes priority indicator. In yet another example, the priority indicator provides information about priority level of the handover response. In one embodiment, the priority level indicates that the handover is mandatory. In another embodiment, the priority level indicates that the handover is recommended.

At the process 1030, the priority level for handover response is determined. For example, the mobile station receives the handover response, processes the priority indicator, and determines the priority level. In one embodiment, the handover in the handover response is mandatory. In another embodiment, the handover in the handover response is recommended.

At the process 1040, criteria for processing handover in the handover response is determined based on priority level. For example, if the handover in the handover response is mandatory, the mobile station should accept the response unless the mobile station is unable to perform such handover. In one embodiment, the mobile station is unable to perform the handover if the mobile station cannot be handed over to any base station listed in the handover response. In another embodiment, the mobile station is unable to perform the handover if the mobile station cannot be handed over to any base station, regardless of whether the base station is or is not listed in the handover response.

In another example, if the handover in the handover response is recommended, the mobile station can determine whether to accept the response based on conditions at the mobile station. In one embodiment, the mobile station determines to reject and/or negotiate the recommended handover even though the mobile station is capable of performing the handover. In another embodiment, the mobile station determines to accept the recommended handover.

At the process 1050, a response to handover response is made. For example, the response to handover response is sent by the mobile station that sends the handover request at the process 1010 and receives the handover response at the process 1020. In another example, the response to handover response is received by the base station that has made the handover response at the process 1020. In one embodiment, the mobile station accepts the handover in the handover response by sending an acknowledgment message to the base station. For example, the mobile station is handed over to a base station selected from the list of base stations provided with the handover response. In another example, the mobile station is handed over to a base station not selected from the list of base stations provided with the handover response.

In another embodiment, the mobile station rejects the handover in the handover response by sending a rejection message to the base station. For example, if the base station receives a rejection to the mandatory handover, the base station would not ask for handover again within a predetermined period of time or under some predetermined conditions. In another example, if the base station receives a rejection to the mandatory handover, the base station would ask for handover again after a predetermined period of time or under certain predetermined conditions. For example, the process 1020 is performed again and followed by one or more other processes. In yet another embodiment, the mobile station negotiates with the base station about handover configuration. For example, the handover configuration includes a list of base stations to which the mobile station can be handed over.

According to certain embodiments of the present invention, the method 1000 uses a response for handover with priority indicator. The response for handover is made through a response message, which also includes a field for priority indicator. As an example, FIGS. 11(A) and (B) are simplified diagrams showing at least parts of a response message for mobile station handover in wireless network according to an embodiment of the present invention. These diagrams are merely an example, which should not unduly limit the scope of the claims. One of ordinary skill in the art would recognize many variations, alternatives, and modifications.

As shown in FIGS. 11(A) and (B), the response message 1100 includes an indication variable called HO operation mode. For example, the HO operation mode is used as the priority indicator for process 1020. In another example, the HO operation mode is a 1-bit parameter to indicate priority level of the handover in the handover response. In yet another example, if the HO operation mode is equal to 0, the handover in the handover response is recommended, and if the HO operation mode is equal to 1, the handover in the handover response is mandatory. In yet another example, the response message 1100 is called MOB_BSHO-RSP.

In one embodiment, the base station sends a response message to the mobile station with HO operation mode equal to 0. The handover in the handover response is recommended, not mandatory. The mobile station processes and responds to the handover response based on conditions at the mobile station. For example, the mobile station can reject and/or negotiate the recommended handover with the base station even though the mobile station is capable of performing the handover in the handover response.

In another embodiment, the base station sends a response message to the mobile station with HO operation mode equal to 1. The handover in the handover response is mandatory. For example, the mobile station processes and accepts the handover response if the mobile station is capable of performing the mandatory handover. The acceptance is made by sending an acknowledgment message to the base station. In another example, if the mobile station is not capable of performing the mandatory handover to any base station listed in the response message, the mobile station rejects the handover in the handover response and negotiates with the base station about handover configuration. In one embodiment, if the base station receives a rejection to the mandatory handover, the base station would not ask for mandatory handover again within a predetermined period of time or under predetermined conditions.

As discussed above and further emphasized here, FIGS. 8 and 10 are merely examples, which should not unduly limit the scope of the claims. One of ordinary skill in the art would recognize many variations, alternatives, and modifications. For example, a priority indicator is used for one or more functions other than mobile station handover. In one embodiment, the priority indicator is included in a request message and/or a response message. In another embodiment, the request message and/or the response message are related to asking a mobile station to enter a sleep mode.

According to another embodiment of the present invention, a method for processing a handover request in a wireless network includes receiving a first message from a first base station by a mobile station. The first message includes a handover request, the handover request includes a priority indicator, and the priority indicator indicates a priority level selected from a plurality of priority levels. Additionally, the system includes determining the priority level based on at least information associated with the first message by the mobile station, processing information associated with the priority level by the mobile station, and determining at least one criterion based on at least information associated with the priority level by the mobile station. Moreover, the system includes processing information associated with the handover request and the at least one criterion by the mobile station, and determining whether to accept the handover request based on at least information associated with the handover request and the at least one criterion by the mobile station. The handover request includes information associated with at least a second base station to which the mobile station is requested to be handed over from the first base station. For example, the method is implemented according to FIG. 8.

According to another embodiment of the present invention, a mobile station for a wireless network includes one or more components for processing a handover request. The one or more components are configured to receive a first message from a first base station. The first message includes a handover request, the handover request includes a priority indicator, and the priority indicator indicates a priority level selected from a plurality of priority levels. Additionally, the one or more components are configured to determine the priority level based on at least information associated with the first message, process information associated with the priority level, and determine at least one criterion based on at least information associated with the priority level. Moreover, the one or more components are configured to process information associated with the handover request and the at least one criterion, and determine whether to accept the handover request based on at least information associated with the handover request and the at least one criterion. The handover request includes information associated with at least a second base station to which the mobile station is requested to be handed over from the first base station. For example, the mobile station can perform according to FIG. 8.

According to yet another embodiment of the present invention, a method for processing a handover request in a wireless network includes generating a first message by a first base station. The first message includes a first handover request, the first handover request includes a first priority indicator, and the first priority indicator indicates a first priority level selected from a plurality of priority levels. Additionally, the method includes sending the first message from the first base station to a mobile station, and receiving a second message from the mobile station. The second message indicates whether the mobile station has determined to accept the first handover request. Moreover, the method includes processing information associated with the second message by the first base station, and determining whether to send a third message to the mobile station based on at least information associated with the first priority level and the second message. The first handover request includes information associated with at least a second base station to which the mobile station is requested to be handed over from the first base station. The third message includes a second handover request, the second handover request includes a second priority indicator, the second priority indicator indicates a second priority level selected from the plurality of priority levels. For example, the method is implemented according to FIG. 8.

According to yet another embodiment of the present invention, a base station for a wireless network includes one or more components for processing a handover request. The one or more components are configured to generate a first message. The first message includes a first handover request, the first handover request includes a first priority indicator, and the first priority indicator indicates a first priority level selected from a plurality of priority levels. Additionally, the one or more components are configured to send the first message to a mobile station, and receive a second message from the mobile station. The second message indicates whether the mobile station has determined to accept the first handover request. Moreover, the one or more components are configured to process information associated with the second message, and determine whether to send a second message to the mobile station based on at least information associated with the first priority level and the second message. The first handover request includes information associated with at least another base station to which the mobile station is requested to be handed over. The second message includes a second handover request, the second handover request includes a second priority indicator, and the second priority indicator indicates a second priority level selected from the plurality of priority levels. For example, the base station can perform according to FIG. 8.

According to yet another embodiment of the present invention, a method for processing a handover response in a wireless network includes receiving a first message from a first base station by a mobile station. The first message includes a handover response, the handover response includes a priority indicator, and the priority indicator indicates a priority level selected from a plurality of priority levels. Additionally, the method includes determining the priority level based on at least information associated with the first message by the mobile station, processing information associated with the priority level by the mobile station, and determining at least one criterion based on at least information associated with the priority level by the mobile station. Moreover, the method includes processing information associated with the handover response and the at least one criterion by the mobile station, and determining whether to accept the handover response based on at least information associated with the handover response and the at least one criterion by the mobile station. The handover response includes information associated with at least a second base station to which the mobile station is asked to be handed over from the first base station. For example, the method is implemented according to FIG. 10.

According to yet another embodiment of the present invention, a mobile station for a wireless network includes one or more components for processing a handover response. The one or more components are configured to send a first message to a first base station. The first message includes a handover request. Additionally, the one or more components are configured to receive a second message from the first base station in response to the first message. The second message includes a handover response, the handover response includes a priority indicator, and the priority indicator indicates a priority level selected from a plurality of priority levels. Moreover, the one or more components are configured to determine the priority level based on at least information associated with the second message, process information associated with the priority level, and determine at least one criterion based on at least information associated with the priority level. Also, the one or more components are configured to process information associated with the handover response and the at least one criterion, and determine whether to accept the handover response based on at least information associated with the handover response and the at least one criterion. The handover response includes information associated with at least a second base station to which the mobile station is asked to be handed over from the first base station. For example, the mobile station can perform according to FIG. 10. In another example, the one or more components are further configured to perform a handover for the mobile station from the first base station to one of the at least the second base station if the handover response is determined to be accepted by the mobile station.

According to yet another embodiment of the present invention, a method for processing a handover response in a wireless network includes generating a first message by a first base station. The first message includes a first handover response, the first handover response includes a first priority indicator, and the first priority indicator indicates a first priority level selected from a plurality of priority levels. Additionally, the method includes sending the first message from the first base station to a mobile station, and receiving a second message from the mobile station. The second message indicates whether the mobile station has determined to accept the first handover response. Moreover, the method includes processing information associated with the second message by the first base station, and determining whether to send a third message to the mobile station based on at least information associated with the first priority level and the second message. The first handover response includes information associated with at least a second base station to which the mobile station is asked to be handed over from the first base station. The third message includes a second handover request, the second handover request includes a second priority indicator, and the second priority indicator indicates a second priority level selected from the plurality of priority levels. For example, the method is implemented according to FIG. 10.

According to yet another embodiment of the present invention, a base station for a wireless network includes one or more components for processing a handover response. The one or more components are configured to generate a first message by a first base station. The first message includes a first handover response, the first handover response includes a first priority indicator, and the first priority indicator indicates a first priority level selected from a plurality of priority levels. Additionally, the one or more components are configured to send the first message from the first base station to a mobile station, and receive a second message from the mobile station. The second message indicates whether the mobile station has determined to accept the first handover response. Moreover, the one or more components are configured to process information associated with the second message by the first base station, and determine whether to send a third message to the mobile station based on at least information associated with the first priority level and the second message. The first handover response includes information associated with at least a second base station to which the mobile station is asked to be handed over from the first base station. The third message includes a second handover request, the second handover request includes a second priority indicator, and the second priority indicator indicates a second priority level selected from the plurality of priority levels. For example, the base station can perform according to FIG. 10. In another example, the one or more components are further configured to receive a fourth message from the mobile station by the first base station. The fourth message includes a handover request, and the first message is in response to the fourth message.

As indicated above, this application claims priority to U.S. Provisional Application No. 60/698,669, filed Jul. 12, 2005, which is incorporated by reference herein. Additionally, IEEE Std 802.16e-2005 is also incorporated by reference herein for all purposes.

The present invention has various advantages. Certain embodiments of the present invention can improve efficiency and smoothness of mandatory handover initiated by a base station. Some embodiments of the present invention provide mandatory network-initiated handover mechanism. Certain embodiments of the present invention provide different priority levels for handover requested by a base station in a handover request and/or a handover response. For example, a mobile station receives a handover request and/or a handover response, and the handover request and/or the handover response include a handover instruction. The mobile station then processes the handover instruction according to a set of criteria corresponding to the priority level. Some embodiments of the present invention can distinguish different types of handover requests initiated by a base station and process these different types of handover requests based on various criteria. Certain embodiments of the present invention can distinguish different types of handovers in handover responses that are made in response to handover requests initiated by a mobile station, and process these different types of handovers based on various criteria.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:
1. A method for processing a handover request in a wireless network, the method comprising:
   receiving a first message from a first base station by a mobile station, the first message including a handover request, the handover request including a priority indicator, the priority indicator indicating a priority level selected from a plurality of priority levels;
   determining the priority level based on at least information associated with the first message by the mobile station;
   processing information associated with the priority level by the mobile station;
   determining at least one criterion based on at least information associated with the priority level by the mobile station;
   processing information associated with the handover request and the at least one criterion by the mobile station;
   determining whether to accept the handover request based on at least information associated with the handover request and the at least one criterion by the mobile station;

wherein the handover request includes information associated with at least a second base station to which the mobile station is requested to be handed over from the first base station.

2. The method of claim 1, and further comprising if the handover request is determined to be accepted by the mobile station, performing a handover for the mobile station from the first base station to one of the at least the second base station.

3. The method of claim 1 wherein the determining whether to accept the handover request comprises:
   if the priority level is determined to be a first level, determining not to accept the handover request even if the mobile station is capable of performing a handover from the first base station to the second base station;
   if the priority level is determined to be a second level, determining to accept the handover request unless the mobile station is capable of performing the handover from the first base station to none of the at least the second base station.

4. The method of claim 3 wherein:
   the first level indicates the handover being recommended;
   the second level indicates the handover being mandatory.

5. The method of claim 1 wherein the priority indicator comprises an indication variable, the indication variable capable of being equal to different values corresponding to different levels of priorities respectively.

6. The method of claim 5 wherein:
   if the indication variable equals a first value, the handover is recommended;
   if the indication variable equals a second value, the handover is mandatory.

7. The method of claim 1, and further comprising generating a second message by the mobile station, the second message indicating whether the mobile station has determined to accept the handover request.

8. The method of claim 1, and further comprising:
   generating the first message by the first base station;
   sending the first message from the first base station to the mobile station.

9. A mobile station for a wireless network, the mobile station comprising:
   one or more components for processing a handover request, the one or more components configured to:
      receive a first message from a first base station, the first message including a handover request, the handover request including a priority indicator, the priority indicator indicating a priority level selected from a plurality of priority levels;
      determine the priority level based on at least information associated with the first message;
      process information associated with the priority level;
      determine at least one criterion based on at least information associated with the priority level;
      process information associated with the handover request and the at least one criterion;
      determine whether to accept the handover request based on at least information associated with the handover request and the at least one criterion;
   wherein the handover request includes information associated with at least a second base station to which the mobile station is requested to be handed over from the first base station.

10. The mobile station of claim 9 wherein the one or more components are further configured to:
    if the handover request is determined to be accepted by the mobile station, perform a handover for the mobile station from the first base station to one of the at least the second base station.

11. The mobile station of claim 9 wherein the determine whether to accept the handover request comprises:
    if the priority level is determined to be a first level, determine not to accept the handover request even if the mobile station is capable of performing a handover from the first base station to the second base station;
    if the priority level is determined to be a second level, determine to accept the handover request unless the mobile station is capable of performing the handover from the first base station to none of the at least the second base station.

12. The mobile station of claim 11 wherein:
    the first level indicates the handover being recommended;
    the second level indicates the handover being mandatory.

13. The mobile station of claim 11 wherein the priority indicator comprises an indication variable, the indication variable capable of being equal to different values corresponding to different levels of priorities respectively.

14. The mobile station of claim 13 wherein:
    if the indication variable equals a first value, the handover is recommended;
    if the indication variable equals a second value, the handover is mandatory.

15. The mobile station of claim 8 wherein the one or more components are further configured to generate a second message, the second message indicating whether the mobile station has determined to accept the handover request.

16. A method for processing a handover request in a wireless network, the method comprising:
    generating a first message by a first base station, the first message including a first handover request, the first handover request including a first priority indicator, the first priority indicator indicating a first priority level selected from a plurality of priority levels;
    sending the first message from the first base station to a mobile station;
    receiving a second message from the mobile station, the second message indicating whether the mobile station has determined to accept the first handover request;
    processing information associated with the second message by the first base station;
    determining whether to send a third message to the mobile station based on at least information associated with the first priority level and the second message;
    wherein:
      the first handover request includes information associated with at least a second base station to which the mobile station is requested to be handed over from the first base station;
      the third message includes a second handover request, the second handover request including a second priority indicator, the second priority indicator indicating a second priority level selected from the plurality of priority levels.

17. The method of claim 16 wherein the determining whether to send a third message to the mobile station comprises:
    if the first priority level indicates the first handover request being mandatory, determining not to send the third message to the mobile station within a predetermined period of time.

18. The method of claim 16, and further comprising:
receiving the first message from the first base station by the mobile station;
determining the priority level based on at least information associated with the first message by the mobile station;
processing information associated with the priority level by the mobile station;
determining at least one criterion based on at least information associated with the priority level by the mobile station;
processing information associated with the handover request and the at least one criterion by the mobile station;
determining whether to accept the handover request based on at least information associated with the handover request and the at least one criterion by the mobile station; and
sending the second message by the mobile station to the first base station, the second message indicating whether the mobile station has determined to accept the handover request.

19. A base station for a wireless network, the base station comprising:
one or more components for processing a handover request, the one or more components configured to:
generate a first message, the first message including a first handover request, the first handover request including a first priority indicator, the first priority indicator indicating a first priority level selected from a plurality of priority levels;
send the first message to a mobile station;
receive a second message from the mobile station, the second message indicating whether the mobile station has determined to accept the first handover request;
process information associated with the second message;
determine whether to send a third message to the mobile station based on at least information associated with the first priority level and the second message;
wherein:
the first handover request includes information associated with at least another base station to which the mobile station is requested to be handed over; and
the third message includes a second handover request, the second handover request including a second priority indicator, the second priority indicator indicating a second priority level selected from the plurality of priority levels.

20. The base station of claim 19 wherein the determine whether to send a third message to the mobile station comprises:
if the first priority level indicates the first handover request being mandatory, determine not to send the third message to the mobile station within a predetermined period of time.

21. A method for processing a handover response in a wireless network, the method comprising:
receiving a first message from a first base station by a mobile station, the first message including a handover response, the handover response including a priority indicator, the priority indicator indicating a priority level selected from a plurality of priority levels;
determining the priority level based on at least information associated with the first message by the mobile station;
processing information associated with the priority level by the mobile station;
determining at least one criterion based on at least information associated with the priority level by the mobile station;
processing information associated with the handover response and the at least one criterion by the mobile station;
determining whether to accept the handover response based on at least information associated with the handover response and the at least one criterion by the mobile station;
wherein the handover response includes information associated with at least a second base station to which the mobile station is asked to be handed over from the first base station.

22. The method of claim 21, and further comprising if the handover response is determined to be accepted by the mobile station, performing a handover for the mobile station from the first base station to one of the at least the second base station.

23. The method of claim 21, and further comprising:
sending a second message from the mobile station to the first base station, the second message including a handover request;
generating the first message by the first base station in response to the second message;
sending the first message from the first base station to the mobile station.

24. A method for processing a handover response in a wireless network, the method comprising:
generating a first message by a first base station, the first message including a first handover response, the first handover response including a first priority indicator, the first priority indicator indicating a first priority level selected from a plurality of priority levels;
sending the first message from the first base station to a mobile station;
receiving a second message from the mobile station, the second message indicating whether the mobile station has determined to accept the first handover response;
processing information associated with the second message by the first base station;
determining whether to send a third message to the mobile station based on at least information associated with the first priority level and the second message;
wherein:
the first handover response includes information associated with at least a second base station to which the mobile station is asked to be handed over from the first base station;
the third message includes a second handover request, the second handover request including a second priority indicator, the second priority indicator indicating a second priority level selected from the plurality of priority levels.

25. The method of claim 24, and further comprising:
receiving a fourth message from the mobile station by the first base station, the fourth message including a handover request;
wherein the first message is in response to the fourth message.

* * * * *